April 7, 1964 J. E. JINES 3,128,128
TRACTION-INCREASING DEVICES FOR TRACTION WHEELS
Filed May 24, 1962

INVENTOR.
James E. Jines
BY Ahley & Ahley
ATTORNEYS

United States Patent Office 3,128,128
Patented Apr. 7, 1964

3,128,128
TRACTION-INCREASING DEVICES FOR
TRACTION WHEELS
James E. Jines, 113 S. Main, Perryton, Tex.
Filed May 24, 1962, Ser. No. 197,411
1 Claim. (Cl. 301—47)

This invention relates to new and useful improvements in traction-increasing devices for traction wheels.

One object of the invention is to provide an improved traction-increasing device for traction wheels which may be quickly and readily connected to a traction wheel for providing increased traction in mud, snow, and over other difficult terrains.

A further object of the invention is to provide an improved device of the character described in which different types of traction elements may be readily substituted one for the other, and which utilizes driving arms formed of a spring-like material such as spring steel for enhancing the traction-increasing effect.

Another object of the invention is to provide an improved device of the character described which may readily be attached to a traction wheel by means of the lug bolts already in use for holding the traction wheel in place, but which does not require removal of the wheel from the vehicle or other structure being propelled thereby or even the elevating of the traction wheel from engagement with the ground surface, and in which the overall circumferential diameter of the traction-increasing device may be readily adjusted as may be desired.

Other and more particular objects of the invention will be apparent from the reading of the following description.

A construction designed to carry out the invention will be hereinafter described, together with other features of the invention.

The invention will be more readily understood from a reading of the following specification and by reference to the accompanying drawing, wherein examples of the invention are shown, and wherein:

FIG. 1 is a vertical view, partly in elevation and partly in section of a traction wheel having attached thereto a traction-increasing device constructed in accordance with this invention, FIG. 2 is a fragmentary, side elevational view taken axially of the traction-increasing device, FIG. 3 is an enlarged, cross-sectional view taken upon the line 3—3 of FIG. 2, FIG. 4 is a vertical, cross-sectional view taken upon the line 4—4 of FIG. 1.

Figure 1:
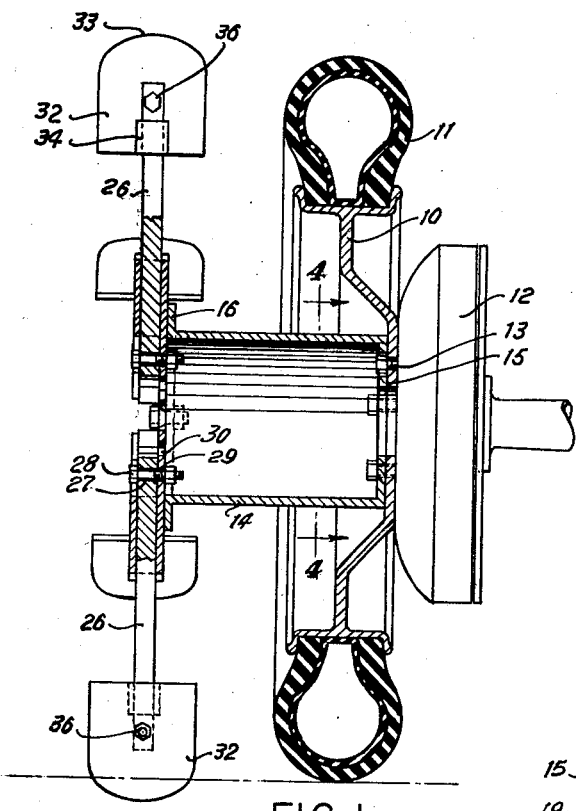

In the drawings, the numeral 10 designates a conventional traction wheel carrying a tire 11 and being secured to the usual hub or drum 12 by conventional lug bolts 13. The traction-increasing device includes a central supporting member or drum 14 cylindrical in configuration and having one end closed by a bottom wall 15. An annular, outwardly projecting flange 16 is carried by the opposite end of the drum 14.

Figure 4:
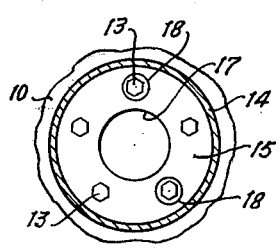

The bottom wall 15 has a central aperture 17 for accommodation of any bearing cap (not shown) which may form a portion of the hub or drum structure 12, and a plurality of circumferentially spaced openings positioned for alinement with the lug bolts 13. Two of the openings 18 are of such diameter as to be capable of passing the heads of the lug bolts, and the remaining three openings 19 are of such diameter as to pass only the shanks of the lug bolts. Of course, any desired number of the openings 18 or 19 may be employed dependent on the number of lug bolts 13 which may be present, in the illustration shown a total of five of the openings 18 and 19 being utilized since this is the most common number of lug bolts in use for mounting wheels in place. The utilization of the two different sizes of openings permits the operator to leave the wheel in place and remove three of the lug bolts corresponding to the openings 19 so that the two lug bolts corresponding to the openings 18 remain in place to hold the wheel in position, thus obviating the necessity of removing the wheel from its normal position or even elevating it from the ground surface. The drum 14 may then be placed in position with the openings 18 alined with the lug bolts 13 which have not been removed, and the removed lug bolts then passed through the openings 19 for retightening as illustrated in FIGS. 1 and 4 in order to secure the drum 14 to the wheel and more securely fasten the wheel to the drum or mounting structure 12.

The flange 16 of the drum 14 has therein a plurality of circumferentially spaced openings 20 and desirably has nuts 21 welded or otherwise secured to the flange in alinement with the openings 20 and positioned upon the rearward or inside face of the flange.

Figures 2, 3:
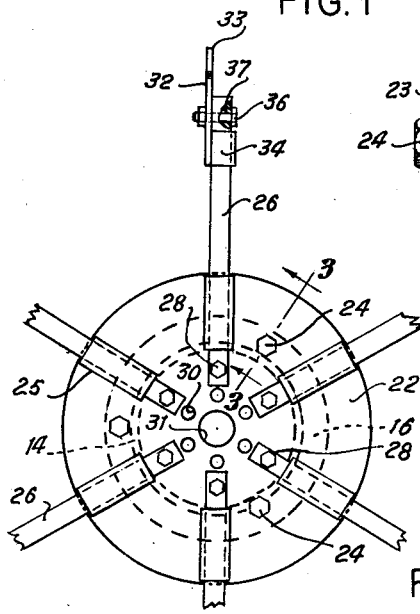

A plate 22, which desirably may be circular and larger in diameter than the flange 16 is formed with a plurality of circumferentially spaced bolt openings 23 corresponding to the openings 20 through which bolts 24 may be passed into engagement with the nuts 22 for tightening and securing the plate 22 to the drum 14. Also, a plurality of sleeves 25 extending radially of the outer face of the plate 22 and being evenly spaced circumferentially thereabout are carried upon the outer surface of the plate 22 and provided desirably with bores of rectangular or non-circular cross-section. Each of the sleeves 25 receives in sliding engagement the inner end of a traction arm 26 having a cross-section corresponding in shape and size to the insides of the sleeves and carrying upon its inner end a transverse opening 27 through which a securing bolt 28 may be passed, the plate 22 having a pair or more of radially aligned openings 29 and 30 for each of the arms. Thus, the arms may be adjusted radially inwardly and outwardly by shifting of the bolt 28 to either one of the openings 29 or one of the other openings 30. As is apparent from FIGS. 1 and 2 of the drawing, the arms 26 have the major portions of their lengths disposed radially outwardly of the outer ends of the sleeves 25. The plate 22 also is formed with a central aperture 31 for access to the inner sides of the bolt openings 29 and 30. A traction element 32 in the form of a rectangular plate having an arcuate outer end 33 carries on its inner end a sleeve 34 of such cross-section as to receive the outer ends of the arms 26 in snug sliding engagement. The traction elements 32 carry bolt openings 35 outwardly of the sleeves 34 for reception of a fastening bolt 36 extending through openings 37 in the outer ends of the arms 26 at right angles to the openings 27 in the inner ends of the arms 26. Thus, the traction elements 32 have their faces disposed in a plane at right angles to the plane of rotation of the traction-increasing device for providing maximum traction engagement with the ground surface. In a modified form of the traction element 32 shown in FIG. 6, the outer edge 38 of the element is serrated for use upon ice and other similar surfaces with which the arcuate edges 33 of the form of the traction element shown in FIG. 5 may not provide sufficient gripping action. The arms 26 are made of a spring-like material, such as spring steel, so as to be capable of yielding laterally toward or away from the tire 11 and to enhance the traction-increasing effect by imparting to the arms a whip-like action.

Figure 5:
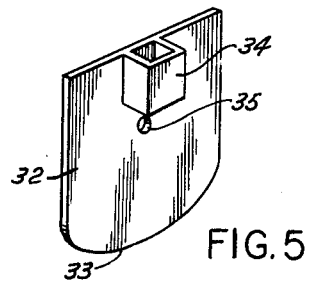
FIG. 5 is an enlarged view in perspective of one of the traction elements.
Figure 6:
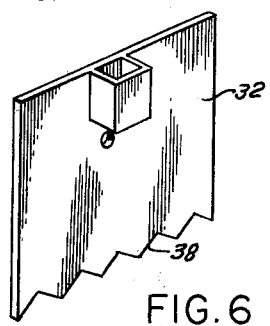
FIG. 6 is an enlarged view in perspective of a modified form of traction element.
Figure 7:
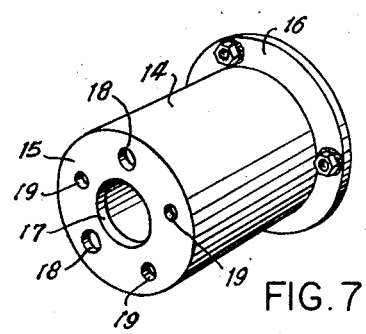
FIG. 7 is a view in perspective of the central supporting drum.

In the use of the traction-increasing device, certain of the lug bolts 13 are removed and the drum 14 is secured in position as previously described, after which the plate 22 is bolted into position upon the flange 16 with the arms 26 in either their inner or outer positions dependent upon in which of the holes 29 and 30 the bolts 28 may be engaged. Dependent also upon the ground conditions, it may be necessary to mount the assembly on the drum 14 with one of the arms in a loose condition or at least not secured in its outer position, and the traction wheel 11 then revolved to move this arm away from the ground surface so that it may then be moved to its outer position and secured therein by passage of the bolt 28 through the opening 29. In most instances, the form of traction element shown in FIG. 5 is most desirably used in muddy conditions, while the form of the traction element shown in FIG. 6 is desirably employed for sand, and snow or ice. The modification shown in FIG. 5 may, however, also be employed in snow.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

A traction-increasing device for traction wheels including, a drum having a bottom wall at one end and an external flange at its opposite end, the bottom wall having a plurality of openings therein, some of the openings being of a size to pass the heads of the lug bolts by which the traction wheel is secured in place, others of the openings being of a size to pass only the shanks of said lug bolts, a plate removably secured to the flange, a plurality of elongate sleeves of non-circular cross-section carried by the plate and disposed radially thereof, elongate rectilinear arms formed of a spring steel material and having cross-sections corresponding in size and shape to the insides of the sleeves, the arms being slidably received in the sleeves for longitudinal adjustment therein and projecting radially outwardly from the perimeter of the plate in a plane parallel to the plate, the arms having the major portion of their lengths disposed radially outwardly of the outer ends of the sleeves, means for selectively positioning the inner portions of the arms in the sleeves, and plate-like traction elements removably secured upon the outer ends of the arms.

References Cited in the file of this patent

UNITED STATES PATENTS

| | | |
|---|---|---|
| 935,104 | Hakanson | Sept. 28, 1909 |
| 2,240,261 | Hodell | Apr. 29, 1941 |
| 2,614,375 | Calkins | Oct. 21, 1952 |
| 2,714,042 | Kelly | July 26, 1955 |
| 2,816,801 | Read | Dec. 17, 1957 |
| 2,830,847 | Samaras | Apr. 15, 1958 |
| 3,017,224 | Palmer | Jan. 16, 1962 |

FOREIGN PATENTS

| | | |
|---|---|---|
| 104,816 | Australia | Aug. 15, 1938 |
| 213,112 | Australia | Feb. 20, 1958 |